US011983902B1

(12) United States Patent
Nussbaum et al.

(10) Patent No.: US 11,983,902 B1
(45) Date of Patent: May 14, 2024

(54) AEROSPACE VEHICLE COMPRISING MODULE FOR METHOD OF TERRAIN, TERRAIN ACTIVITY AND MATERIAL CLASSIFICATION

(71) Applicant: Government of the United States, as represented by the Secretary of the Air Force, Wright-Patterson AFB, OH (US)

(72) Inventors: Matthew Edward Nussbaum, Penn Valley, CA (US); Marissa Sachiko Herron, Annapolis, MD (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 834 days.

(21) Appl. No.: 17/080,904

(22) Filed: Oct. 27, 2020

Related U.S. Application Data

(60) Provisional application No. 63/026,842, filed on May 19, 2020.

(51) Int. Cl.
| | |
|---|---|
| *G06T 7/00* | (2017.01) |
| *G06F 16/535* | (2019.01) |
| *G06F 16/55* | (2019.01) |
| *G06T 3/12* | (2024.01) |
| *G06T 3/40* | (2006.01) |

(52) U.S. Cl.
CPC .............. *G06T 7/97* (2017.01); *G06F 16/535* (2019.01); *G06F 16/55* (2019.01); *G06T 3/12* (2024.01); *G06T 3/40* (2013.01)

(58) Field of Classification Search
CPC . G06T 7/97; G06T 3/40; G06F 16/537; G06F 3/40
See application file for complete search history.

(56) References Cited

U.S. PATENT DOCUMENTS

| | | | | |
|---|---|---|---|---|
| 2007/0080851 | A1* | 4/2007 | Shapira | G01J 3/2823 |
| | | | | 342/195 |
| 2014/0301659 | A1* | 10/2014 | Li | G06T 5/50 |
| | | | | 382/263 |
| 2015/0363641 | A1* | 12/2015 | Navulur | G09B 29/106 |
| | | | | 382/113 |

(Continued)

OTHER PUBLICATIONS

Gonzalez, R. C.; Digital Image Processing Using MATLAB, 2nd ed. 2009, 199-202.

(Continued)

*Primary Examiner* — Myron Wyche
(74) *Attorney, Agent, or Firm* — AFMCLO/JAZ; James F. McBride

(57) ABSTRACT

A method of classifying terrain, terrain activity and materials through panchromatic imagery a module programmed to provide such classification and aerospace vehicles comprising such module is provided. Panchromatic images of known materials terrains and terrain activities are taken and processed to form a multiband texture cube, that due it amount of data, is stored as a computer data base. New panchromatic images of unclassified materials, terrains and/ or terrain activities are processed and compared via computer with such database that allows for inexpensive, quick and efficient classification of such new images.

11 Claims, 11 Drawing Sheets
(3 of 11 Drawing Sheet(s) Filed in Color)

(56) References Cited

U.S. PATENT DOCUMENTS

2022/0004762 A1* 1/2022 Kottenstette ........ G06F 18/2413
2022/0114906 A1* 4/2022 Landers ................. G09B 9/003

OTHER PUBLICATIONS

L3 Harris Geospatial Solutions, Harris Geospatial Solutions, Inc. 2019, 1-13.

Harlick R. M.; Shanmugam, K.; Dinstein, I.; Textural Features For Image Classification, IEEE Transactions on Systems, Man and Cybernetics 1973, SMC-3, 6, 610-621.

* cited by examiner

Fourier Filter Workflow Part One:

Fourier Filter Workflow Part Two:

Notch Filter Results - Specific Material Identification

The red is produced by a mask overlaid on to the original image (blue).
The mask (red) represents the results of the filtered material's frequency.

The band filter identifies all directions

AEROSPACE VEHICLE COMPRISING MODULE FOR METHOD OF TERRAIN, TERRAIN ACTIVITY AND MATERIAL CLASSIFICATION

CROSS-REFERENCE TO RELATED APPLICATION

The present application claims priority to U.S. Provisional Application Ser. No. 63/026,842 filed May 19, 2020, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to terrain, activity on said terrain and material classification through panchromatic imagery, a module programmed to provide such classification and aerospace vehicles comprising such module.

BACKGROUND OF THE INVENTION

Remote sensing is used to classify terrain, terrain activity and materials. Spectral sensors and synthetic aperture radar (SAR) are the current sensor technologies of choice for terrain and material classification. Unfortunately, such technologies are expensive, complex, and have lower spatial resolution as spectral imagery deals with material interaction with light at the atomic and molecular scales and while radar interacts at both the atomic and larger scales, it produces non-literal images. As a result, such technologies struggle with the classification of terrain, terrain activity and materials.

As the aforementioned problems have remained, despite significant research, unsolved by the military and scientific community, Applicants applied an unconventional technique to remote sensing. The methods disclosed herein employ statistically derived Haralick texture measurements and Fourier frequency isolation filters. Such filters are tuned to different spatial windows and frequencies producing a multiband texture cube similar to a spectral cube. This allows false color composites, multiband texture profiles, and material classification maps to be derived from panchromatic sensors. Panchromatic sensors allow for spatial texture analysis which measures material interaction with light at larger scales such as leaves, branches, and tree canopies. A significant benefit of Applicant's method is that it only requires panchromatic images. Panchromatic images of known materials and terrains are taken and processed as provided above to form a multiband texture cube that due to the amount of data, is stored as a computer database. New panchromatic images of unclassified materials and/or terrains are processed and compared via computer with such database that allows for inexpensive, quick and efficient classification of such new images. Such classification can be achieved in real time by an aerospace vehicle equipped with a sensor that can obtain images and a module programmed to provide such classification.

SUMMARY OF THE INVENTION

A method of classifying terrain, terrain activity and materials through panchromatic imagery a module programmed to provide such classification and aerospace vehicles comprising such module are disclosed. Panchromatic images of known materials terrains and terrain activities are taken and processed to form a multiband texture cube, that due it amount of data, is stored as a computer data base. New panchromatic images of unclassified materials, terrains and/or terrain activities are processed and compared via computer with such database that allows for inexpensive, quick and efficient classification of such new images.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
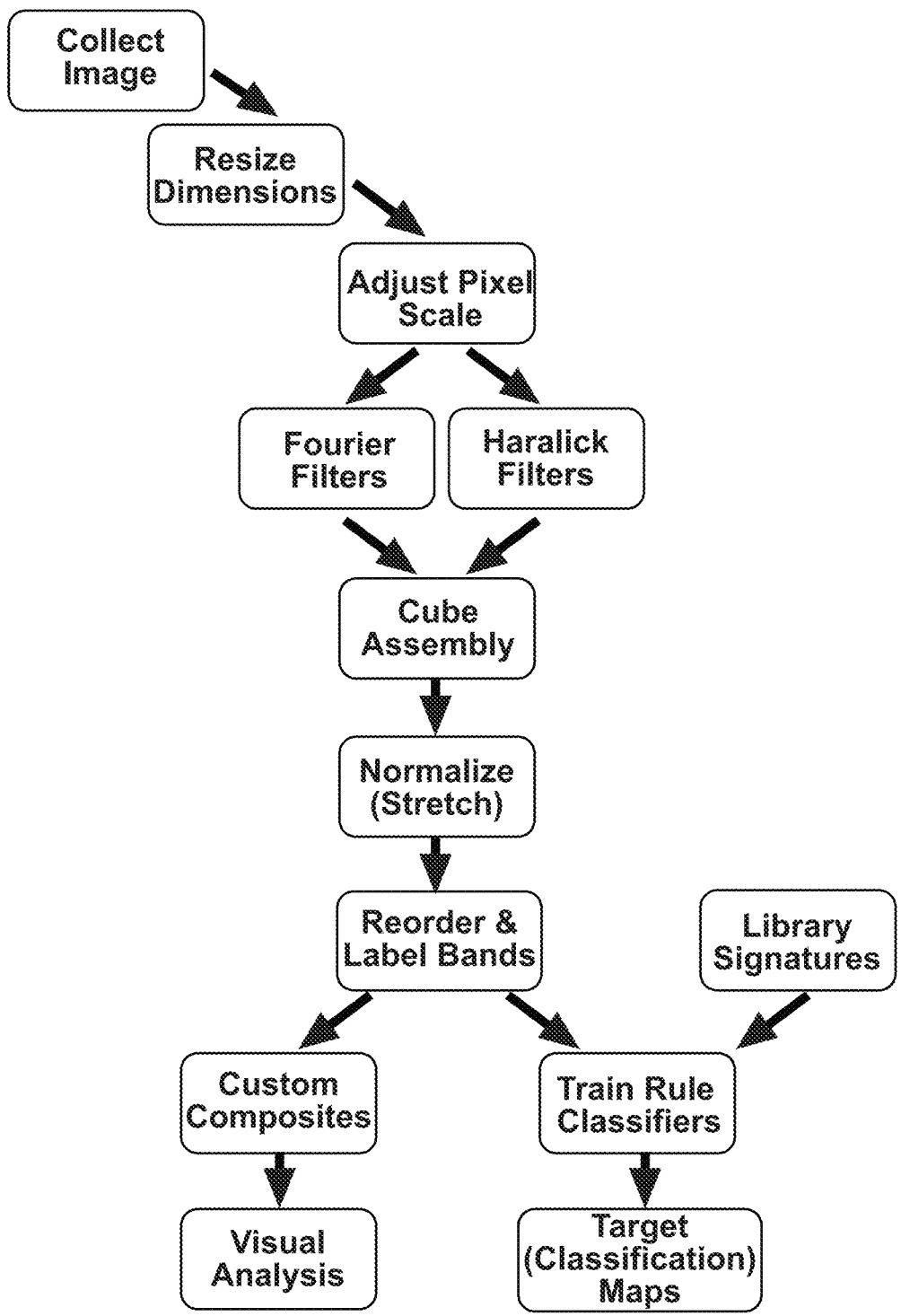
FIG. 1 is a schematic displaying the process steps for the method of building a database for use in the present method.
Figure 2:
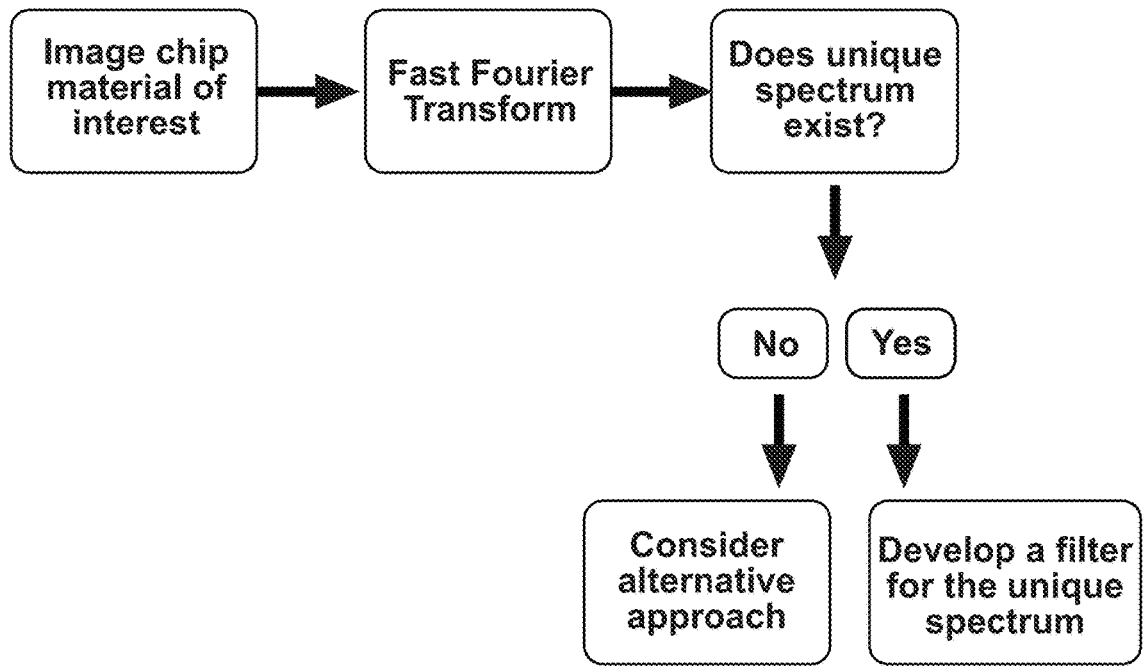
FIG. 2 is a schematic displaying the process steps of Fourier Filter Workflow Parts One and Two.
Figure 2:
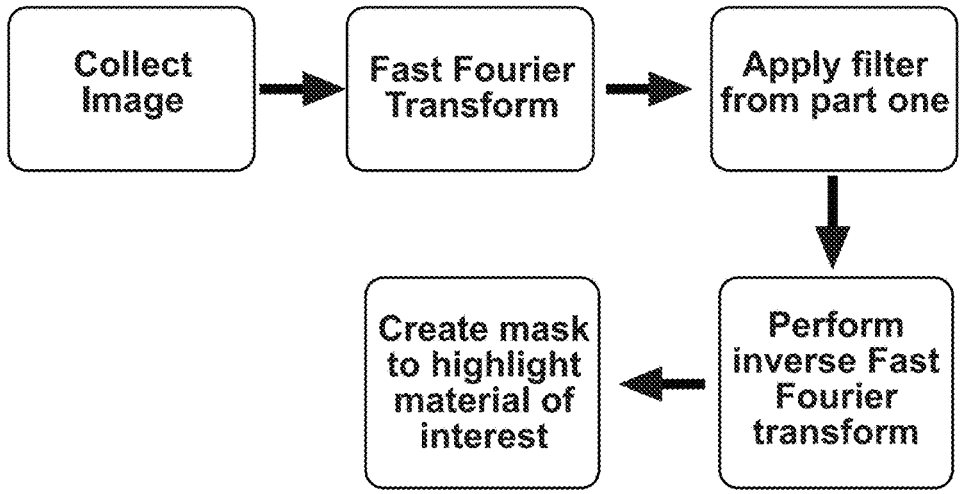

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

TABLE 1

Aerospace Vehicle Type and Modes of Guidance, Navigation, and Control

| Vehicle | GNC Methods | Maneuver Method |
| --- | --- | --- |
| AIR | | |
| Weather Balloon | radiosonde, theodolite | pressure inside balloon |
| Manned aircraft | altimeter, inertial navigation system (INS), Global Positioning System (GPS) | thrust, flight control surfaces |
| Unmanned aircraft | altimeter, INS, GPS | thrust, flight control surfaces |
| Quadcopter | visual sensor, GPS | propeller(s) |
| Airborne Missile | altimeter, INS, GPS | thrust, flight control surfaces |
| AEROSPACE | | |
| Scientific Balloon | star camera, altimeter | pressure inside balloon |
| Sounding Rocket | ring laser gyro, altimeter, accelerometers | thrust, flight control surfaces |
| Space Shuttle | human-in-the-loop, star camera | thrust, flight control surfaces |
| Launch Vehicle (Rocket) | INS, ring laser gyro, altimeter, accelerometers | thrust, flight control surfaces |
| Ballistic Missile | INS, GPS | thrust, flight control surfaces |
| SPACE | | |
| Satellite | star camera, sun sensor, horizon sensor, GPS | thruster, electric propulsion, magnetorquer, momentum wheel |
| Space Station | human, star camera, sun sensor, horizon sensor, GPS | thruster, electric propulsion, magnetorquer, momentum wheel |
| Interplanetary Vehicle | star camera, sun sensor | thruster, electric propulsion, momentum wheel |

Examples of Flight Control Surfaces: Fins, Ailerons, Elevators.
Thrust includes the two-directional thrust force, as well as any gimbaled thrust vectoring the vehicle is capable of generating.

Method of Identify Terrain, Terrain Activity and/or Materials

Applicants disclose a method of identify terrain, terrain activity and/or materials, said method comprising:
   a) comparing one or more panchromatic images that have been processes as follows:
      (i) resizing said one or more images' dimensions to establish a scale for each image;
      (ii) adjusting the pixel scale of said one or more images;
      (ii) filtering at least one of said one or more images' through a Fourier filter and/or a Haralick filter to generate a set of multiple images;
      (iii) combining each set of multiple images to form a cube assembly for each set of images, each cube assembly having multiple new bands;
      (iv) normalize the cube;
      (v) reordered and labeled each cube assemblies' bands to match the library or reference database format or band sequence;
   with an image database that comprises images that have been processed in the same manner as said one or more images.
   b) using said comparison to identify one or more terrains, terrain activities and/or materials contained in one or more images of said panchromatic images.

Applicants disclose the method of Paragraph 0028, wherein resizing said one or more images' dimensions to establish a scale for each image comprises normalizing said images against real world pixels so that about equivalent sizing is used amongst the images. This is performed by comparing the focal plane distance from the material of interest to the sensor focal length and internal focal plane pixel size. In simple term in each image to be processed materials of interest such as leaves, crops, roof tiles, etc. should be equivalently sized in the image; e.g. each roof tile is about 5×5 pixels. It will be impossible to perfectly resize an image for perfect uniformity, even at nadir. As such this is compensated for by running two kernel sizes and not overly constraining the Fourier frequency output. This resizing can be performed automatically as each image is stored on the sensor storage drive.

Applicants disclose the method of Paragraphs 0028 through 0029 wherein adjusting the pixel scale of said one or more images comprises so that about equivalent pixel scaling is used amongst the images so that a reference signature library is applicable.

Applicants disclose the method of Paragraphs 0028 through 0030 wherein filtering at least one of said one or more images' through a Fourier filter and/or a Haralick filter to generate a set of multiple images comprises producing images with the material of interest identified or terrain of interest identified through utilization of a multi-layer texture band.

Applicants disclose the method of Paragraphs 0028 through 0031 wherein combining each set of multiple images to form a cube assembled for each set of images comprises each cube assembly having bands defined by the original imagery and the filtered imagery as the individual bands.

Applicants disclose the method of Paragraphs 0028 through 0032 wherein normalizing the cube comprises setting the cube to a scale, preferably the scale of a user.

Applicants disclose the method of Paragraphs 0028 through 0033 wherein reordering and labeling each cube assemblies' bands wherein the bands of the cube are reordered according to the standard set of a user's library or database set. If the images are sequenced in this order, the interoperable (open source) automatic database searches amongst separate data sets is viable: 1: original panchromatic, 2: Correlation (Kernel 3×3), 3: Entropy (3×3), 4: Homogeneity (3×3), 5: Second Moment (3×3); 6: Data Range (3×3), 7: Dissimilarity (3×3), 8: Variance (3×3), 9: Contrast (3×3), 10: Skewness (3×3), 11: Correlation (Kernel 15×15), 12: Entropy (15×15), 13: Homogeneity (15×15), 14: Second Moment (15×15); 15: Data Range (15×15), 16: Dissimilarity (15×15), 17: Variance (15×15), 18: Contrast (15×15), 19: Skewness (15×15), 20: FFT Band 1, 21: FFT Band 2, 22: FFT Band 3, 23: FFT Band 4, 24: FFT Band 5.

Applicants disclose the method of Paragraphs 0028 through 0034 wherein using said comparison to identify one or more terrains, terrain activities and/or materials contained in one or more images of said panchromatic images the cube of imagery is used to identify the material or the terrain of interest by searching each pixel in the cube and comparing it the signature of interest taken from a library or database. Module and Aerospace Vehicle Comprising Same Applicants disclose a module comprising a central processing unit programmed to classify terrain, terrain activity and/or materials according to the method of Paragraphs 0028 through 0035. As will be appreciated by the skilled artisan, any programming language may be used, including ENVI and Matlab.

Applicants disclose the module of Paragraph 0036, said module comprising an input/output controller, a random access memory unit, and a hard drive memory unit, said input/output controller being configured to receive a first digital signal, preferably said first digital signal comprises data from a sensor, more preferably said first digital signal comprises digitized imagery, and transmit a second digital signal comprising the updated aerospace vehicle's position and/or attitude, to said central processing unit.

Applicants disclose an aerospace vehicle comprising:
a) a module according Paragraphs 0036 through 0037;
b) a sensor pointed towards the earth, preferably said sensor comprises a camera;
c) an internal and/or external power source for powering said aerospace vehicle
d) an onboard central processing unit; and
e) a means to maneuver said aerospace vehicle, preferably said means to maneuver said aerospace vehicle is selected from the group consisting of a flight control surface, propeller, thruster, electric propulsion, magnetorquer, momentum wheel, more preferably said means to maneuver said aerospace vehicle is selected from the group consisting of thruster, electric propulsion, magnetorquer, momentum wheel.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. Building a database can be done through existing imagery or new imagery. The database can also be expanded by using imagery from satellites, from a personal camera, or any other imagery source. In other words, the imagery is not required to originate from an airplane and can originate from many sources. Consider the following example that collects imagery within a controlled environment on the ground.

Figure 3:
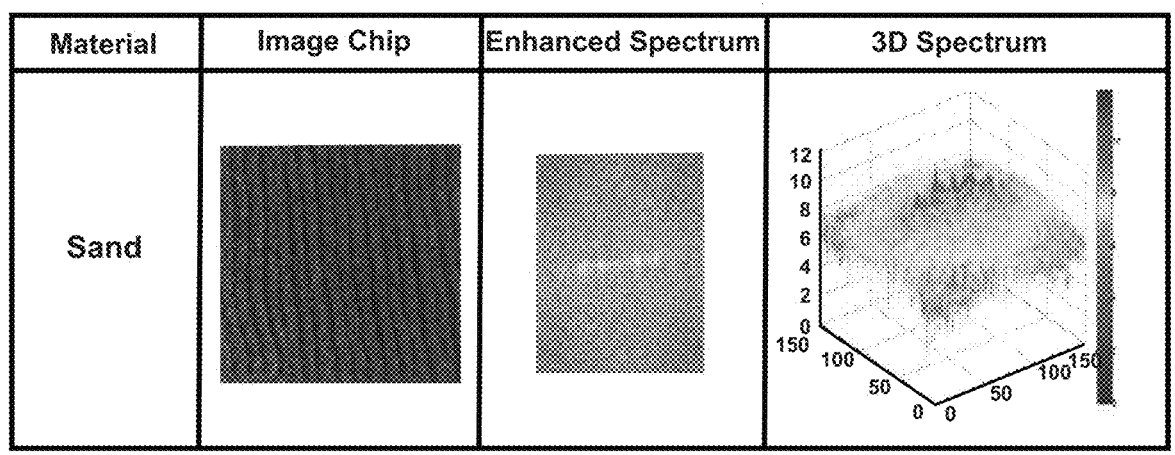
FIG. 3 provides the image chip, enhanced spectrum and 3D spectrum of sand.

1. Using a camera capture an image scene that contains a patch of grooved sand. The entire image is referred to as the "image scene." The patch of grooved sand is the "material of interest."
2. Create an image chip of the material of interest by cropping the image scene such that only the patch of grooved sand remains.
3. Import the image scene and the image chip into Matlab.
4. Identify the unique signature frequency of the patch of grooved sand by doing the following:
   a) Converting the image chip from image space to frequency space using Matlab's Fourier transform function.
   b) Plotting the enhanced spectrum of the frequency space. This plot is used to identify and record the location of the image chip's frequency (in x-y coordinates). More specifically, to look for the white space in the plot. (If desired, the 3D spectrum of the frequency space can also be plotted for an additional perspective in viewing the resultant frequency of the image chip.)
   C) The recorded location of this image chip's frequency should now be documented and contributed to the development of a library of material frequencies for further application. The image chip, enhanced spectrum and 3D spectrum of sand are displayed in FIG. 3.

Repeat all of the above steps for different materials of interest and the building of the database.

5. Using the image scene and chip from step 3 above calculate the corresponding pixel Ground Sampling Distance (GSD) and then set a proportional pixel size just larger than the signature/material of interest. Run this kernel once for each of the following equations and generate a new image band: Correlation, Entropy, Homogeneity, Second Moment, Data Range, Dissimilarity, Variance, Contrast, Skewness creating image bands 2-10. Each of these bands use the Robert Haralick statistics equations found in wide body of literature. The most recognized source paper is Robert M Haralick; K Shanmugam; Its'hak Dinstein (1973) "Textural Features for Image Classification". IEEE Transactions on Systems, Man, and Cybernetics. SMC-3 (6): 610-621. However, the equations have been updated for application in software such as ENVI. For a simple explanation of the equations as they are used by software such as ENVI, see www.harrisgeospatial.com/docs/backgroundtexturemetrics.html. These are used in the list below. Further research is in Warner, T. "Kernel-based Texture in Remote Sensing image Classification. "Geography Compass" 5/10 (2010:781-798. doi: 10.1111/j.1749-8198.2011.00451.

Data Range=Highest digital number−lowest digital number $$\text{Correlation} = \frac{\sum_i \sum_j P(i,j) - \mu_x \mu_y}{\sigma_x \sigma_y}$$

$$\text{Entropy} = -\sum_{i=1}^{N_g-1} P(l) * \ln P(i)$$

$$\text{Homogeneity} = \sum_{i=1}^{N_g} \sum_{j=1}^{N_g} \frac{1}{1+(i-j)^2} P(i,j)$$

$$\text{Second Moment} = \sum_{i=1}^{N_g} \sum_{j=1}^{N_g} (P(i,j))^2$$

$$\text{Dissimilarity} = \sum_{i=1}^{N_g} \sum_{j=1}^{N_g} P(i,j)|i-j|$$

$$\text{Variance} = \sum_{i=0}^{N_g-1} (i-M)^2 P(i)$$

$$\text{Contrast} = \sum_{i=1}^{N_g} \sum_{j=1}^{N_g} P(i,j)(i-j)^2$$

$$\text{Skewness} = \sum_{i=0}^{N_g-1} (i-M)^3 P(i)$$

$$\text{Mean}(M) = \sum_{i=0}^{N_g-1} iP(i)$$

6. To increase material classification accuracy the kernel can be run in the same sequence a second time also layering on the new image bands with a kernel roughly five times larger than the first creating image bands 11-19.

Figure 11:
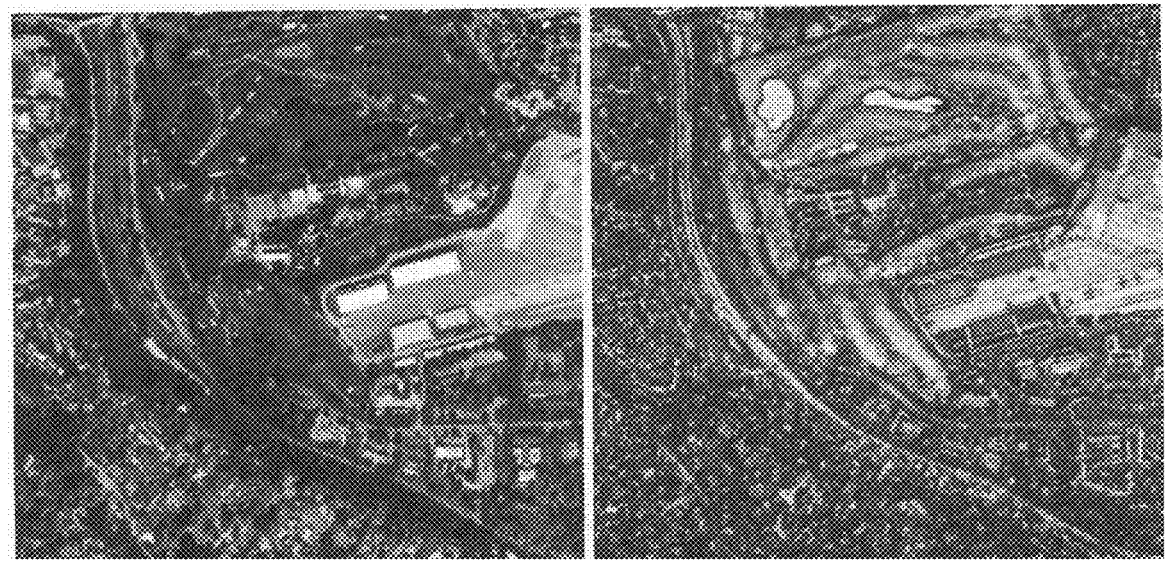
FIG. 11 depicts the homogeneity conversion of Monterey California.

7. The new cube can then have the Fourier frequency bands layered in as bands 20-24. This cube can be used to create false color composite images to aid visual image analysis or to generate texture signature by comparing the digital number of each pixel at the corresponding image x and y coordinates. See FIG. 11 for an example that provides the homogeneity conversion of Monterey California.

Example 2: Identification of activities from patches of dirt having a grooved pattern from an image scene.

Figure 4:
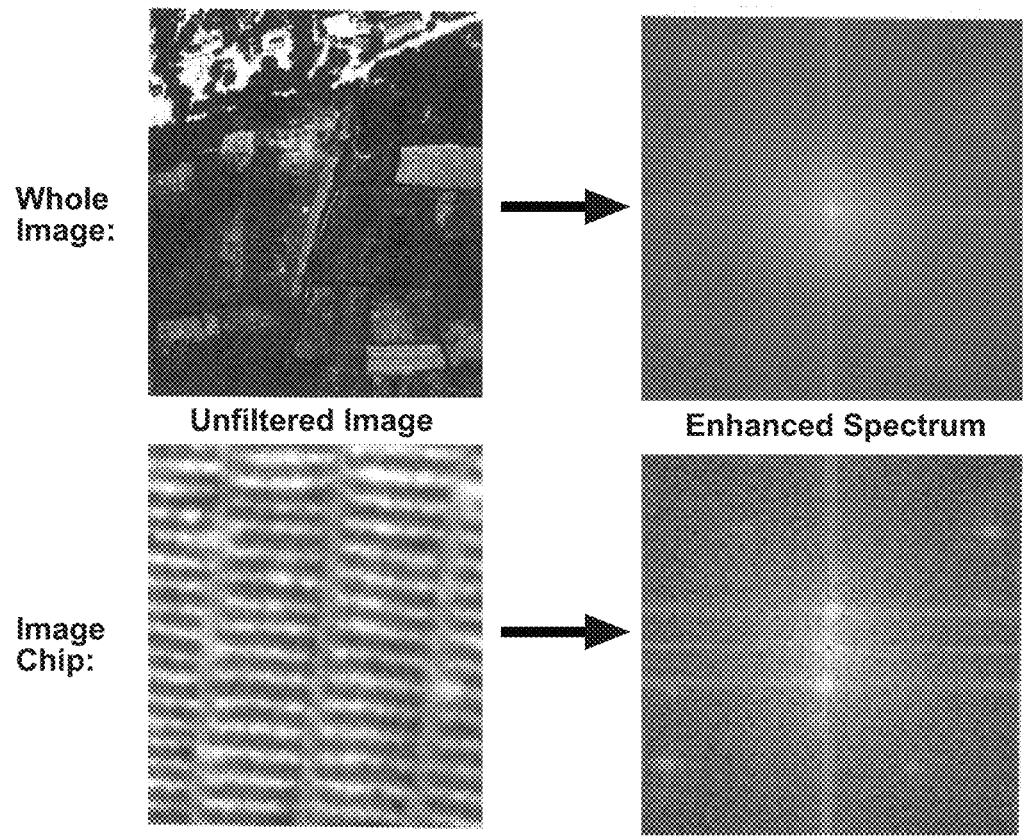
FIG. 4 provides a notch filter example of terrain.
Figure 5:
FIG. 5 depicts a composite false color image (with independent scaling) of the results is created with the original image in blue and mask in magenta.

Images of the area of interest are collected using a camera mounted in an aerospace vehicle. Such images are made available as a set of panchromatic images in National Imagery Transmission Format (NITF). Then particular area of interest, a patch of grooved sand, is chipped out of image scene. The image scene and the image chip are imported into Matlab. The unique signature frequency of the patch of grooved sand is identified by doing the following:

a) Converting the image chip from image space to frequency space using Matlab's Fourier transform function.

b) Plotting the enhanced spectrum of the frequency space. This plot is used to identify and record the location of the image chip's frequency (in x-y coordinates). More specifically, to look for the white space in the plot. (If desired, the 3D spectrum of the frequency space can also be plotted for an additional perspective in viewing the resultant frequency of the image chip. The recorded location of this image chip's frequency can also be contributed to the development of a library of material frequencies for further application.)

c) The unique frequency of the image chip is filtered from the image scene. This step distinguishes between the image chip material within the image scene. A notch filter example is provide in FIG. 4.

d) A band pass filter or notch pass filter, as found on pages 199 to 202 of the book titled Digital Image Processing Using Matlab $2^{nd}$ edition as published by Gatesmart 2009, authors Rafael C. Gonzalez, Richard E. Woods, and Steven L. Eddins is applied to the image scene. The band pass and notch pass filters must include the location identified above for the image chip frequency. (Consider applying a band pass filter if the material of interest is at varying angles. The radius and width of the band pass should be defined by the same image chip frequency determined in earlier steps.)

e) A mask from the results of the filter applied to the image scene is created and stored as a logical matrix.

f) The mask is applied to the image scene by zeroing out the "No" values and keeping the "Yes" values (within the logical matrix). The "Yes" values retain the original image values because they are simply multiplied by one.

g) The original image scene and the mask are shown side by side. The mask is displayed in red and the original image scene is displayed in blue.

h) A composite false color image (with independent scaling) of the results is created with the original image in blue and mask in magenta (colors can be changed). This is provided in FIG. 5. Matlab's Imfuse Function can then be used to fuse the image scene and the mask together. This step applies a color mask over the image scene in the areas from which the image chip was filtered. The resulting image highlights the material of interest in the image scene. The result is an image with the material of interest quickly and easily distinguished from the entire image. This is particularly useful for large image scenes that capture a large amount of information. Since the material of interest may be difficult to distinguish from the entire image, this process produces a result that will locate the material with a color that distinguishes the material from the entire image.

i) The same steps from the previous Example 1 are run concurrently or after these Fourier steps to form the texture cube for either signature analysis or storage into a texture signature library.

Figure 6:
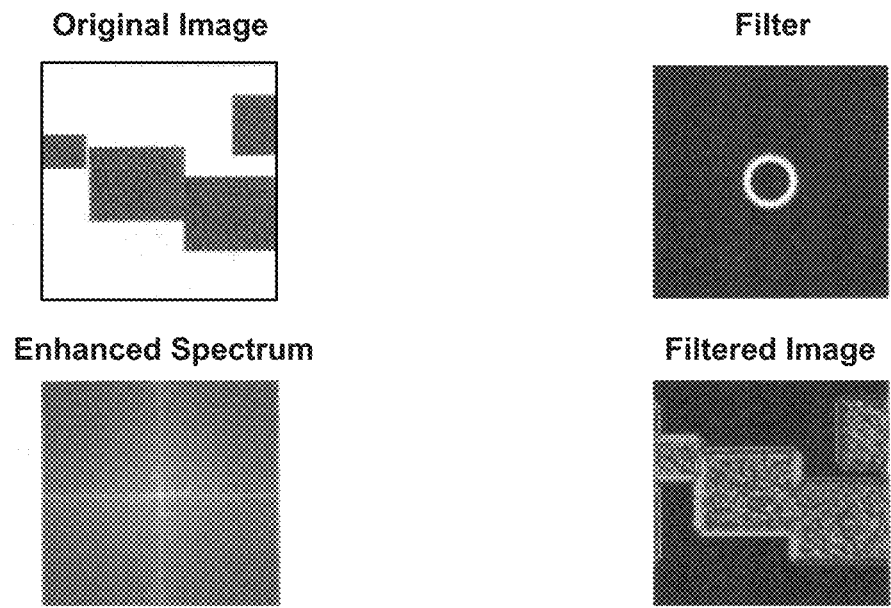
FIG. 6 depicts multiple patches of sand of different sizes with Gaussian Band Pass Filter.

Example 3. A process according to Example 2 is implemented, however in this example the images are captured from a camera mounted on the International Space Station and the material of interest is different sizes within the image scene as shown in FIG. 6.

Figure 7:
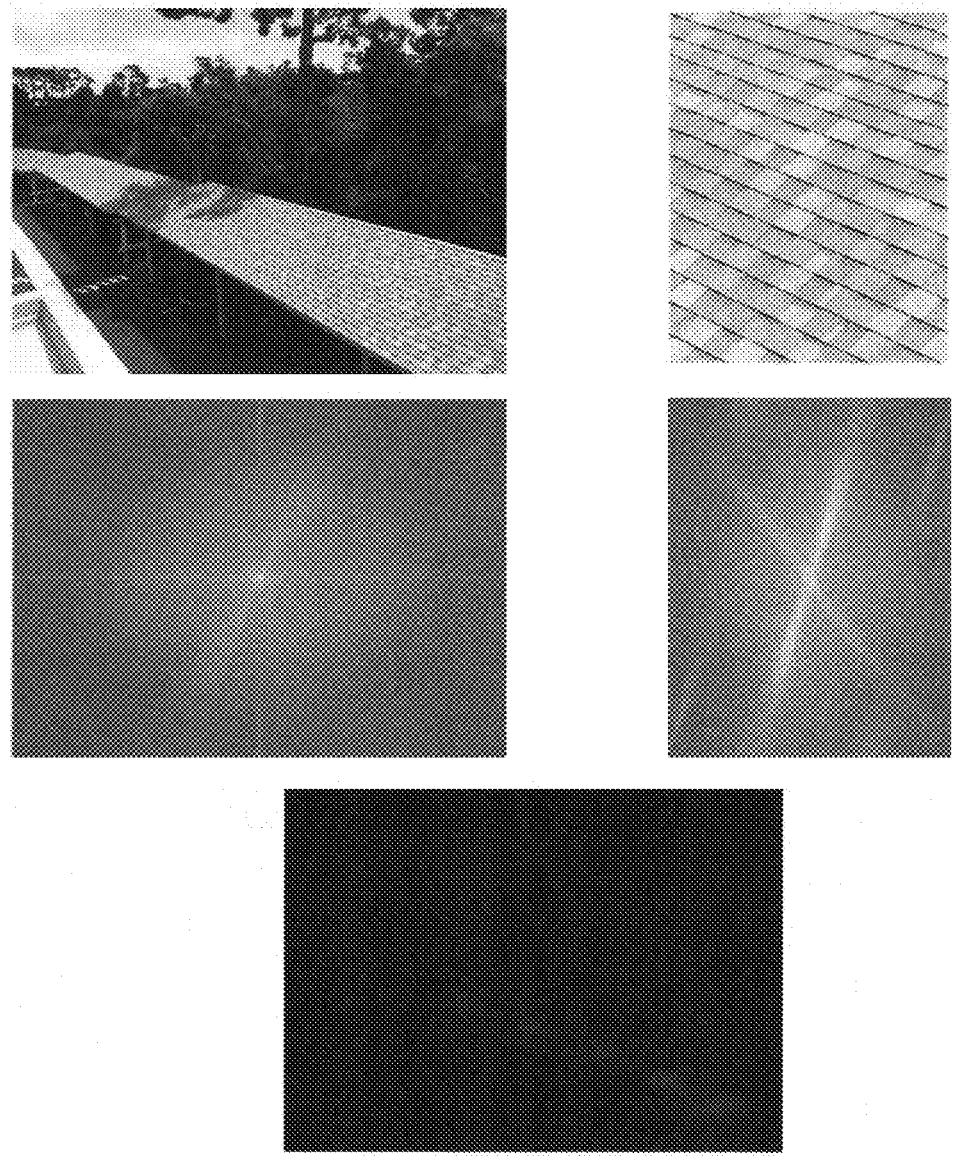
FIG. 7 depicts the original image of a roof top, as well as the corresponding, image chip, enhanced spectrum image of the original image, enhanced spectrum of the image chip and results from frequency spaced filtering that are obtained when the method of the present application is conducted.

Example 4. A process according to Example 2 is implemented, however in this example the material of interest is buildings with a tiled roof as shown in FIG. 7.

Example 5. A process according to Example 2 is implemented, however, in this example, a camera mounted on an unmanned aerial vehicle captures the images and the material of interest is plowed fields.

Example 6. A process according to Example 2 is implemented, however, in this example, a camera mounted on a high altitude balloon captures the images and the materials of interest are orchards and farm fields.

Example 7. A process according to Example 2 is implemented, however, in this example, fields of wind turbines and fields of solar panels are the materials of interest. Materials that display spatial patterns are well suited for frequency filtering. More examples of materials of interest include shipping containers, city grids or streets, pipelines, antenna arrays.

Example 8. Processes 2 through 7 are repeated except the database is used to provide the signature unique to the material of interest. In other words, a new exploitation of a new set of imagery can reference the database for a previously identified signature associated with the material of interest. More specifically, the execution of the above example can be expedited if the material of interest is already documented in an existing database. For example, if the grooved sand were already documented in the database as occurred in Example 1, then Example 2 can skip steps a and b. Instead, Example 2 would use the frequency for the respective material of interest from the database and begin with step c. The image processing requires modern high performance on-board graphics processing cards such as Nvidia, AMD or GeForce to perform the Fourier frequency transforms and then Haralick kernel transforms. However, the signature library is extremely low data size as each signature is a corresponding value across 24 texture categories. Tens of thousands of signatures can easily be stored on a small RAM or Solid State Drives.

Figure 8:
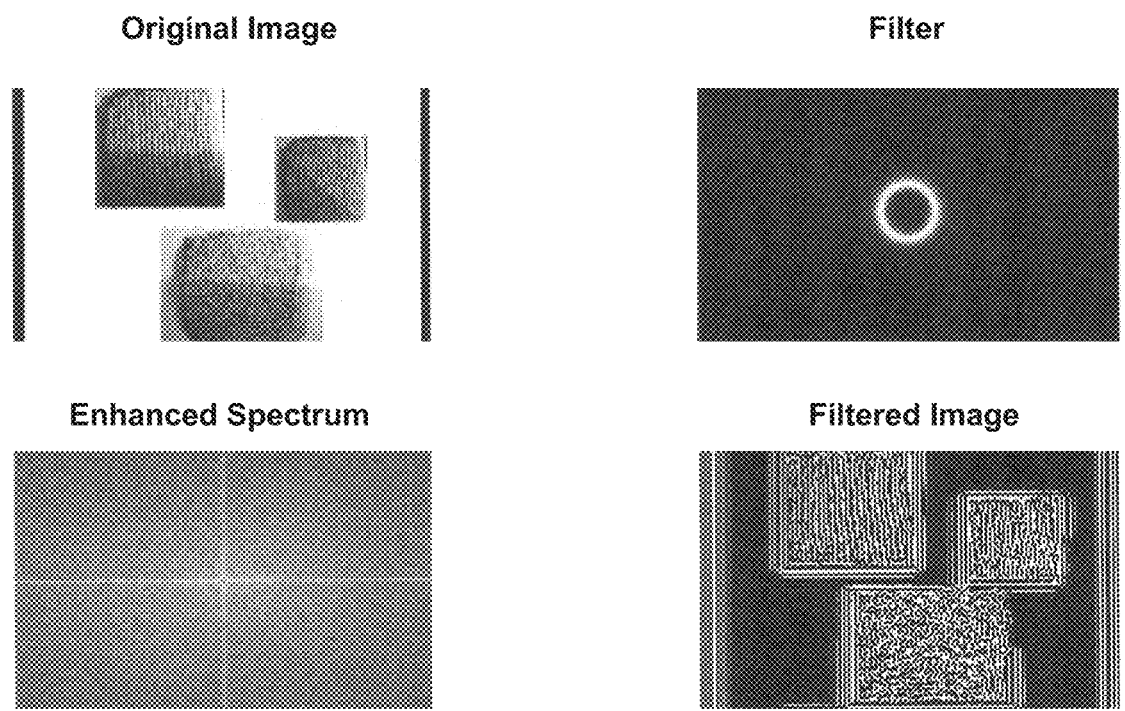
FIG. 8 depicts a groomed sand patch under different lighting conditions with a High Pass Gaussian Filter.

Example 9. A process according to Example 2 is implemented, however in this example the images are captured from a camera mounted on the International Space Station and the material of interest is captured with different lighting conditions within the image scene. FIG. 8 provides an example of this.

Figure 9:
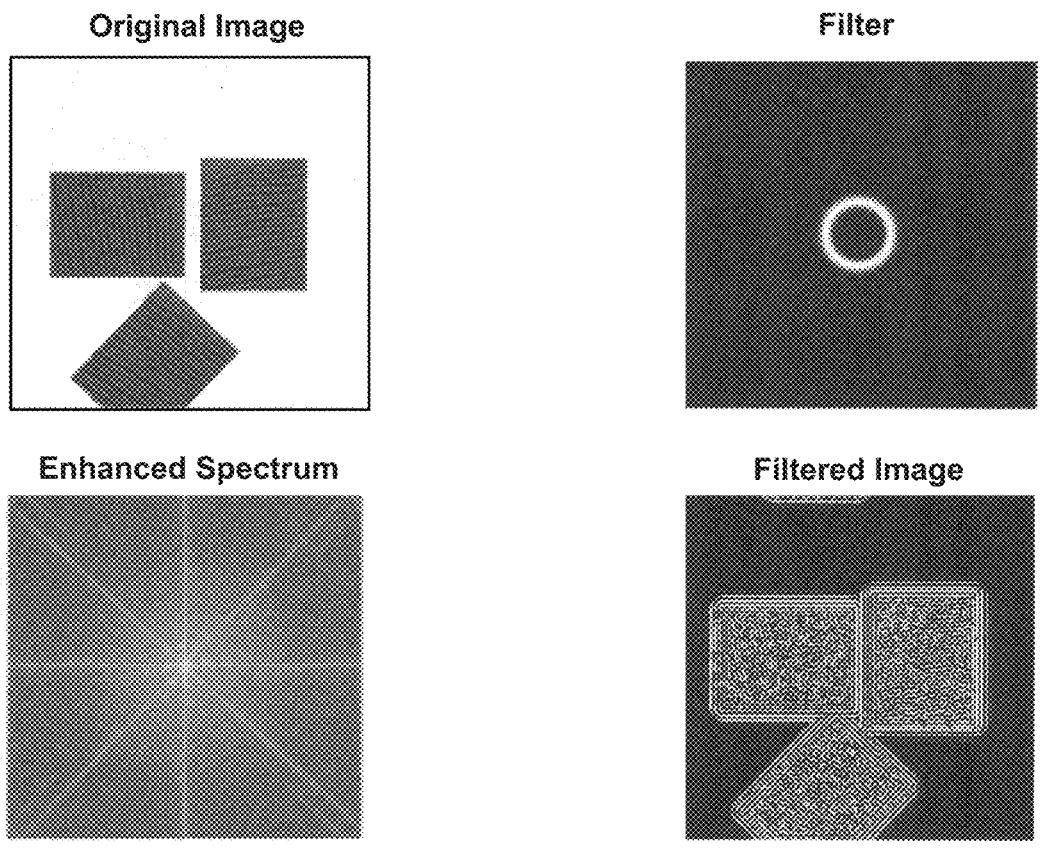
FIG. 9 depicts three patches of sand with Butterworth Band Pass Filter.

Example 10. A process according to Example 2 is implemented, however in this example the images are captured from a camera mounted on the International Space Station and the material of interest is rotated at varying angles throughout the image scene. FIG. 9 provides an example of this.

Figure 10:
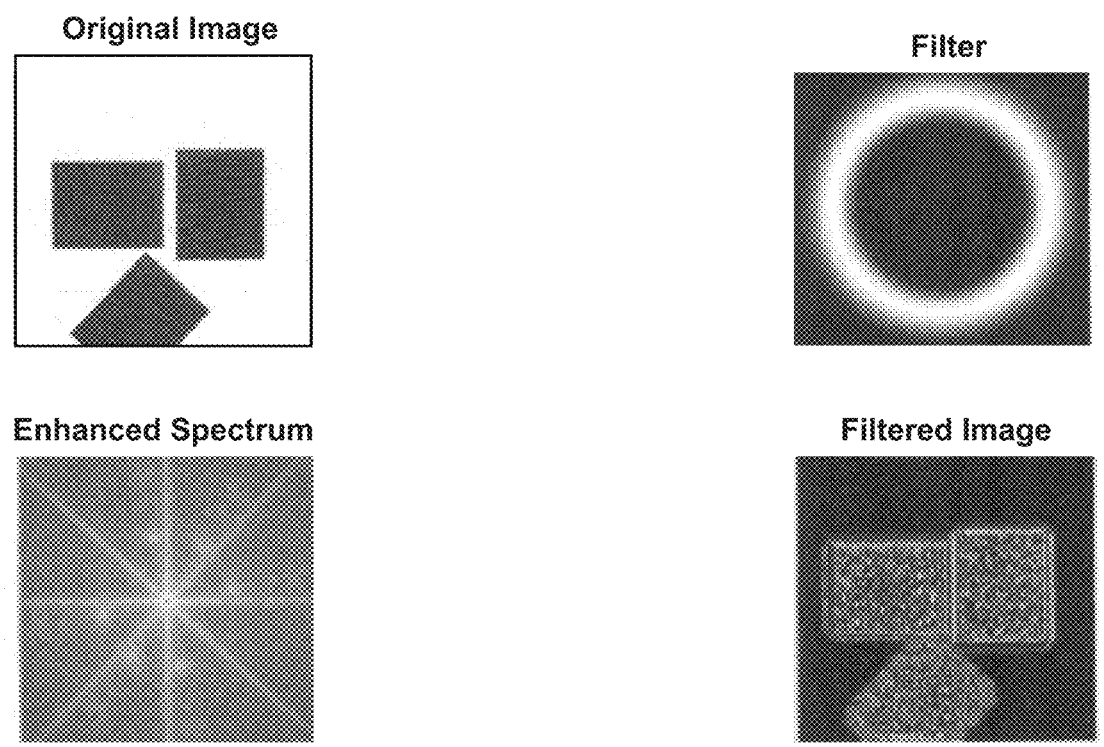
FIG. 10 depicts three patches of sand of reduced resolution with a Gaussian Band Pass Filter.

Example 11. A process according to Example 2 is implemented, however in this example the images are captured from a camera mounted on the International Space Station and the image scene provided varies in resolution. FIG. 10 provides an example of this.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for identifying terrain, terrain activity and/or materials, said method comprising:
   a) comparing one or more panchromatic images that have been processed as follows:
      (i) resizing dimensions of said one or more panchromatic images to establish a scale for each panchromatic image;
      (ii) adjusting a pixel scale of said one or more panchromatic images;
      (iii) filtering at least one of said one or more panchromatic images through a Fourier frequency isolation filter and/or a statistically derived Haralick texture measurement filter, said filters being tuned to different spatial windows and frequencies, said filtering generating a set of multiple images;
      (iv) combining the set of multiple images to form a multiband texture cube assembly for the set of images, the multiband texture cube assembly having multiple new bands;
      (v) normalizing the multiband texture cube assembly;
      (vi) reordering and labeling the multiple new bands to match a library or reference database format or a band sequence;
      with an image database that comprises images that have been processed in the same manner as said one or more panchromatic images;
   b) using said comparison to identify one or more terrains, terrain activities and/or materials contained in one or more images of said panchromatic images.

2. The method of claim 1, wherein resizing said one or more panchromatic images' dimensions to establish a scale for each panchromatic image comprises normalizing said one or more panchromatic images against real world pixels.

3. The method according to claim 2 wherein adjusting the pixel scale of said one or more panchromatic images comprises equivalent pixel scaling.

4. The method according to claim 3 wherein normalizing the multiband texture cube assembly comprises setting the multiband texture cube assembly to a scale.

5. A module comprising a central processing unit programmed to classify terrain, terrain activity and/or materials according to the method of claim 1.

6. A module comprising a central processing unit programmed to classify terrain, terrain activity and/or materials according to the method of claim 2.

7. A module comprising a central processing unit programmed to classify terrain, terrain activity and/or materials according to the method of claim 3.

8. The module of claim 5 said module comprising an input/output controller, a random access memory unit, and a hard drive memory unit, said input/output controller being configured to receive a first digital signal, preferably said first digital signal comprises data from a sensor, more preferably said first digital signal comprises digitized imagery, and transmit a second digital signal comprising the updated aerospace vehicle's position and/or attitude, to said central processing unit.

9. The module of claim 6 said module comprising an input/output controller, a random access memory unit, and a hard drive memory unit, said input/output controller being configured to receive a first digital signal, preferably said first digital signal comprises data from a sensor, more preferably said first digital signal comprises digitized imagery, and transmit a second digital signal comprising the updated aerospace vehicle's position and/or attitude, to said central processing unit.

10. The module of claim 7 said module comprising an input/output controller, a random access memory unit, and a hard drive memory unit, said input/output controller being configured to receive a first digital signal, preferably said first digital signal comprises data from a sensor, more preferably said first digital signal comprises digitized imagery, and transmit a second digital signal comprising the updated aerospace vehicle's position and/or attitude, to said central processing unit.

11. An aerospace vehicle selected from the group consisting of:
   a) an aerospace vehicle comprising
      (i) a module according claim 5;
      (ii) a sensor pointed towards the earth;
      (iii) an internal and/or external power source for powering said aerospace vehicle;
      (iv) an onboard central processing unit; and
      (v) a means to maneuver said aerospace vehicle;
   b) an aerospace vehicle comprising:
      (i) a module according claim 6;
      (ii) a sensor pointed towards the earth, said sensor comprising a camera;
      (iii) an internal and/or external power source for powering said aerospace vehicle;
      (iv) an onboard central processing unit; and
      (v) a means to maneuver said aerospace vehicle, said means to maneuver said aerospace vehicle is selected from the group consisting of a flight control surface, propeller, thruster, electric propulsion, magnetorquer, momentum wheel;
   c) an aerospace vehicle comprising:
      (i) a module according claim 7;
      (ii) a sensor pointed towards the earth, said sensor comprising a camera;
      (iii) an internal and/or external power source for powering said aerospace vehicle;
      (iv) an onboard central processing unit; and
      (v) a means to maneuver said aerospace vehicle, said means to maneuver said aerospace vehicle being selected from the group consisting of a flight control surface, propeller, thruster, electric propulsion, magnetorquer, momentum wheel;
   d) an aerospace vehicle comprising:
      (i) a module according claim 8;
      (ii) a sensor pointed towards the earth;
      (iii) an internal and/or external power source for powering said aerospace vehicle;
      (iv) an onboard central processing unit; and
      (v) a means to maneuver said aerospace vehicle, said means to maneuver said aerospace vehicle being selected from the group consisting of a flight control surface, propeller, thruster, electric propulsion, magnetorquer, momentum wheel;
   e) an aerospace vehicle comprising:
      (i) a module according claim 9;
      (ii) a sensor pointed towards the earth;
      (iii) an internal and/or external power source for powering said aerospace vehicle;
      (iv) an onboard central processing unit; and
      (v) a means to maneuver said aerospace vehicle, said means to maneuver said aerospace vehicle being selected from the group consisting of a flight control surface, propeller, thruster, electric propulsion, magnetorquer, momentum wheel, more preferably said means to maneuver said aerospace vehicle is selected from the group consisting of thruster, electric propulsion, magnetorquer, momentum wheel; and
   f) an aerospace vehicle comprising:
      (i) a module according claim 10;
      (ii) a sensor pointed towards the earth;
      (iii) an internal and/or external power source for powering said aerospace vehicle;
      (iv) an onboard central processing unit; and
      (v) a means to maneuver said aerospace vehicle, said means to maneuver said aerospace vehicle being selected from the group consisting of a flight control surface, propeller, thruster, electric propulsion, magnetorquer, momentum wheel.

* * * * *